Patented Aug. 12, 1941

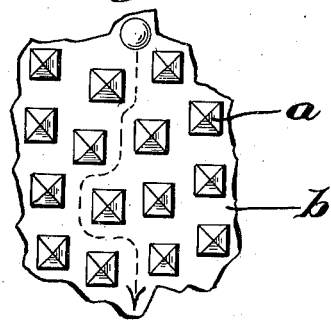
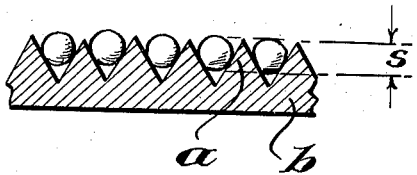
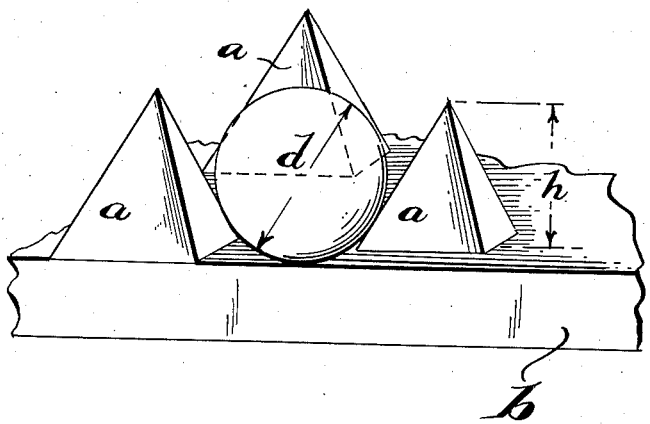
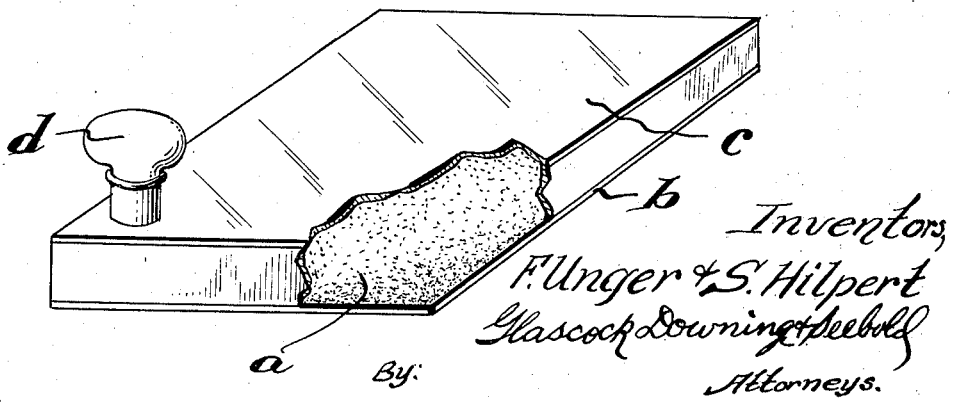

2,252,475

UNITED STATES PATENT OFFICE 2,252,475

TESTING VESSEL FOR HOLDING FERROMAGNETIC SUSPENSIONS

Franz Unger and Richard Siegfried Hilpert, Brunswick-Gliesmarode, Germany

Application November 7, 1938, Serial No. 239,416
In Germany November 13, 1937

3 Claims. (Cl. 175—183)

To render visible magnetic fields suspensions, for instance of oil, with ferromagnetic powders are used, in the pouring-on method as well as when testing vessels are employed which hold the suspension.

If the same suspension is used in the pouring-on method and then in the testing vessel it behaves quite differently as regards sensitiveness of the indication, remaining at rest of the field picture and so forth. This phenomenon could at first not be explained. Only more accurate researches lead to the knowledge that the quantity of the ferromagnetic powder in relation to the quantity of the liquid plays a part. Large quantities of powder were commonly used in the pouring-on method and this has to be considered as correct as the greatest portion of the powder is washed away and only few particles remain adhering on the points to be examined. To this has to be added that the poured-on layer of liquid is very thin whereby the movability of the ferromagnetic particles is impeded.

The use of a suspension with large quantities of powder quite suitable for the pouring-on method lead to failures when employed in the testing vessel. The indication sensitiveness was small. The field pictures were blurred. The pictures did not hold on vertical holding walls and even when the testing vessel was in horizontal position the pictures became blurred as soon as the testing vessel was no longer under the influence of the magnetic field. The reason is obviously the much greater thickness of the liquid layer in the testing vessel compared with that of the liquid layer in the pouring-on method. If greater quantities of powder are used the grains can deposit on one another so that, a layer of powder grains deposits on the bottom of the vessel, and on this layer other layers of grains can settle. The upper layers of grains can then be moved by even the slightest shaking or flow. The result thereof is, that the field picture becomes blurred. To use these known suspensions for testing in the vertical vessel is quite impossible. The picture then cannot be retarded even for a short time.

The grain size, if the suspension is used in the testing vessel, has quite another effect than in the pouring-on method.

To obviate the difficulties it is proposed, according to the invention, to select, when using suspensions in vessels, the quantity of the addition in ferromagnetic powder so low that, after a bottom layer has settled in the magnetic field no other movable layers can deposit on the bottom layer.

If, in accordance with the invention, the quantity of the suspended particles is selected very small the by far greatest portion will deposit on the bottom, adhere on the bottom and remain out of the flow of liquid. The greatest adhering capability of the layer on the bottom is due, on the one hand, to the fact that the magnetic force is greatest on the bottom and on the other hand to the further fact that near the walls the current, which might exist, is much less great than at some distance from the wall. The friction conditions between wall and powder grains certainly play also an important part.

In order to obtain the covering of a certain portion of the bottom surface different quantity proportions will have to be selected for different powders. It has been found, that, for instance, in water as suspending liquid, on 1 cm.$^2$ bottom surface 0.1 mgr. of ferromagnetic iron ferrite powder results in particularly favourable conditions. If carbonyl iron is used 1 mgr. has to be employed on every cm.$^2$ of bottom surface of the vessel.

If quantity of powder and bottom surface are compared by indicating the share by percentage of the surface covered by the powder, it is found that the most favourable surface covering is below 20%.

According to the invention it is further proposed to choose the grain size of the powder addition of oxides and sulphides of the iron below $\frac{1}{20}$ mm., the best results having been obtained with grain sizes of about $\frac{1}{100}$ to $\frac{1}{200}$ mm.

It is particularly advisable, if the suspension in the testing vessel is under over-pressure.

The adhering capability of the particles on the bottom can be further considerably increased by a special construction of the bottom. It is therefore proposed, according to the invention, to give to the inner side of the bottom of the vessel a uniformly rough screened surface, similar to a screen of a light-sensitive layer of photographic films, in other words, there are provided only discontinuous grooves so as to prevent the magnetic powder particles from sliding along a groove when the testing vessel is used on vertical or inclined surfaces. The degree of roughness will then have to be chosen, according to the grain size of the powder to be used, so that the depth of the roughening of the bottom surface corresponds to approximately the average grain diameter. The particles are attracted on to the bottom by the magnetic force and deposit in the indentations. They are protected in the indentations against the current of the liquid. If the bottom of the vessel is in vertical position the particles find hold on the individual elevations of the screen. This screen must not be regular, for instance so that chains of elevations and indentations are formed, as the powder can slip along in the furrows formed. The screen has preferably an irregular arrangement of elevations and indentations so that a grain which is in movement always encounters again an elevation.

The invention is illustrated in the accompanying drawing, in which:

Fig. 1 is an enlarged fragmentary top plan detail of a portion of the bottom of the test vessel showing the roughened surface which provides a series of discontinuous grooves, Fig. 2 is a sectional detail thereof, Fig. 3 is an enlarged fragmentary perspective detail of a portion of the bottom of the vessel, and Fig. 4 is a perspective detail of the test vessel.

The surface of the bottom $b$ of the vessel has a great number of elevations $a$ which cover the surface of the bottom in irregular arrangement. The height $h$ of the individual elevators is approximately equal to the average grain diameter $d$. The roughness of the surface, i. e. the height of the elevations, need not be accurately the same for all elevations.

The flat test vessel is preferably provided with a cover $c$ consisting of a transparent material in a known manner. The test vessel is also provided with pressure equalizing means consisting of an expansion vessel $d$.

If the grains are of ray shape or flat the effect of the screen surface is much stronger.

We claim:

1. The combination of a suspension of ferromagnetic particles with a test vessel having a bottom member for use in examining materials for flaws, by the magnetic method, said bottom element being roughened on its upper surface to provide irregular indentations forming discontinuous grooves, the size of said indentations corresponding to the grain size of the ferromagnetic particles.

2. The combination as claimed in claim 1, wherein the ferromagnetic particles consist of ferromagnetic oxides and sulphides, the diameter of which is at most $\frac{1}{20}$ mm.

3. The combination as claimed in claim 1, wherein the suspension in the test vessel is maintained under pressure.

FRANZ UNGER.
RICHARD SIEGFRIED HILPERT.